Dec. 25, 1962 D. S. ADAMS 3,069,726
PROCESS FOR PREPARING ARTICLES HAVING SECTIONS WITH METALLIC
LUSTER ALTERNATING WITH SECTIONS WHICH ARE CLEAR
Original Filed March 4, 1958 2 Sheets-Sheet 1
FIG. 1
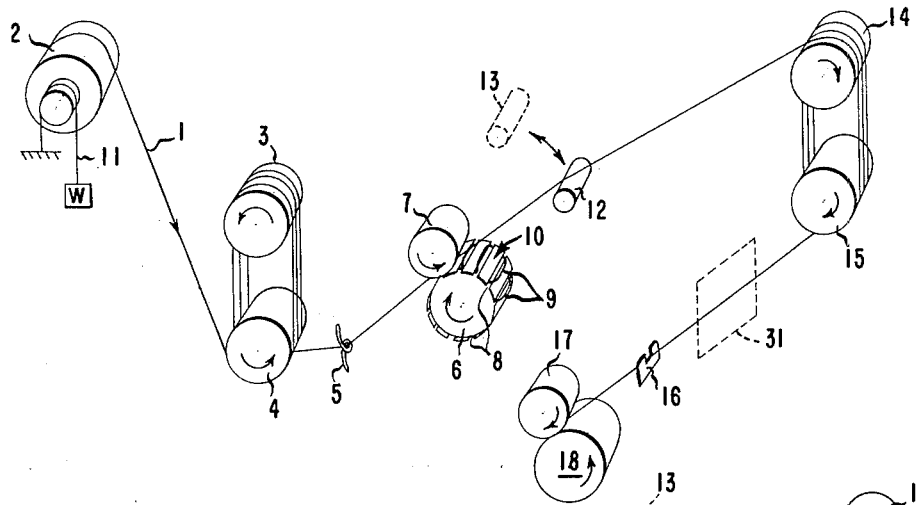
FIG. 2
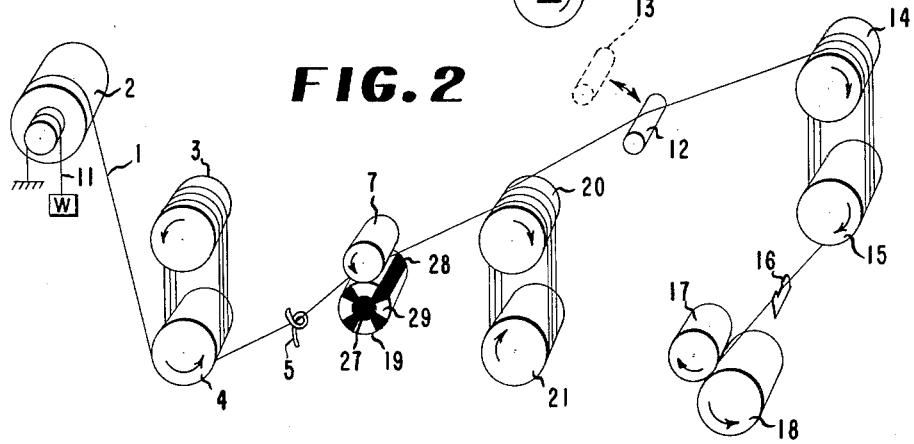
FIG. 3A
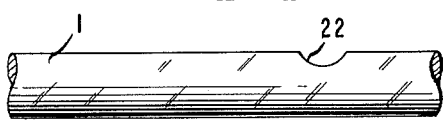
FIG. 3B
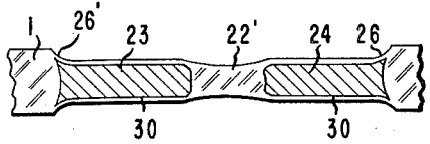
FIG. 3C
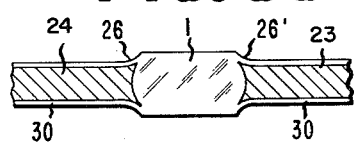
FIG. 3D
INVENTOR
DUSTIN S. ADAMS
BY
ATTORNEY

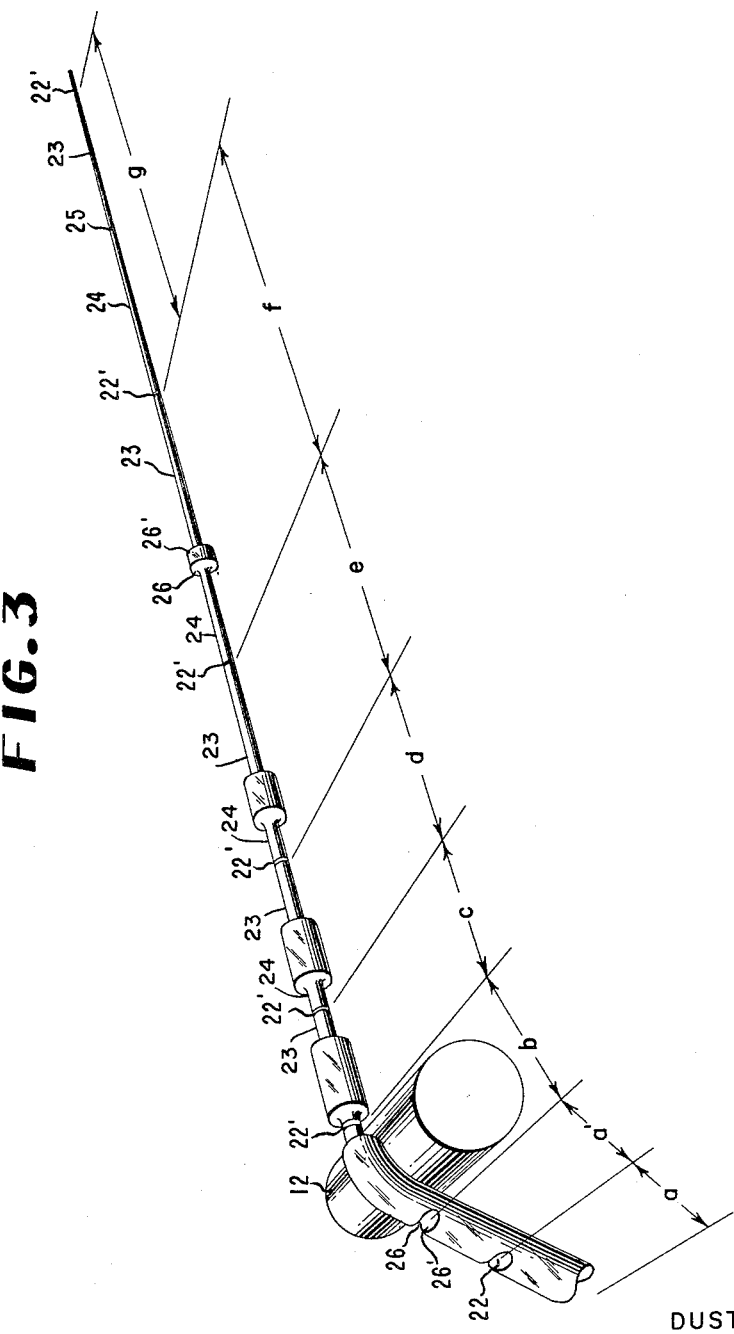

3,069,726
PROCESS FOR PREPARING ARTICLES HAVING SECTIONS WITH METALLIC LUSTER ALTERNATING WITH SECTIONS WHICH ARE CLEAR
Dustin S. Adams, Wilmington, Del., assignor to E. I. du Pont de Nemours and Company, Wilmington, Del., a corporation of Delaware
Original application Mar. 4, 1958, Ser. No. 719,144. Divided and this application May 24, 1961, Ser. No. 112,408
8 Claims. (Cl. 18—48)

This invention relates to a process for preparing novel decorative shaped articles from synthetic organic polymers. More particularly, the invention relates to a process for preparing decorative fibers, ribbons, and filaments having sections with a metallic luster alternating with sections having an essentially clear, conventional appearance.

This application is divisional application of U.S. application Serial No. 719,144, filed March 4, 1958.

Processes for producing films and filaments which have a continuous luster have been described. Adams et al. U.S. Patent 2,352,725 teaches that polyamide films can ester films and filaments can be drawn to produce a filament having a continuous metallic luster. Under the conditions described, a highly drawn lustrous filament is produced which has a thin, clear skin and an internal structure containing small, elongated voids. Markwood U.S. Patent 2,352,725 teaches that polyamide films can be drawn under certain critical conditions to produce a product similar to that described in the Adams et al. patent. In addition, Markwood teaches that sections of the lustrous film can be rendered transparent by the application of pressure. The process has been found, however, to be impractical from a commercial standpoint in view of the fact that the drawing rate must be kept very low, i.e., under 1.5 inches per second. Also, the product produced by transparentizing areas of the film has been found to be unsuitable for some purposes since the voids are not completely healed by the application of pressure and consequently may recur during some processing steps.

It is, therefore, an object of this invention to provide a process for preparing new decorative shaped articles which have alternating clear and metallic-appearing sections from synthetic organic polymers. A further object of this invention is to provide a process for preparing filaments and yarns having a uniform denier which does not require complex processing conditions or processing equipment. Another object is to provide a process for preparing novel synthetic fibers of good physical properties with portions having an internal structure containing a large number of small, elongated voids, and other portions having a monolithic structure. Still another object of this invention is to provide a high speed, commercially acceptable process whereby decorative yarns, ribbons, and filaments can be prepared with sections of metallic appearance alternating with sections of clear, conventional appearance. Other objects will be apparent from the following detailed description.

The objects of this invention are achieved by a process which comprises introducing into an undrawn, essentially unoriented, synthetic organic polymeric shaped article, e.g., one having a birefringence of less than 0.01, localized portions or zones having a birefringence above 0.01, and thereafter cold-drawing the article at its natural draw ratio at a temperature of not more than 80° C. whereby clear, monolithic sections alternating with opaque, void-containing sections having a metallic luster are produced in the article. A preferred embodiment of the invention comprises mechanically deforming the article to introduce segments of reduced cross-sectional area into the article, heating the article to a temperature of not more than 80° C. by passing it over a heated surface, and subsequently drawing the article at its natural draw ratio. The segments of reduced cross-sectional area which have their birefringence raised above 0.01 serve as incipient draw initiation points for cold-drawing the article as will be later described. Drawing is usually accomplished at or near room temperature. In another embodiment, segments of higher orientation are introduced into the article by heating it at spaced intervals to a temperature above 80° C. but below the melting point and thereafter drawing it by known processes whereby the heated sections draw to produce sections which are clear and highly oriented and the unheated sections remain undrawn. The article is then drawn at a temperature of not more than 80° C. at its natural draw ratio, thereby producing, from the unoriented portions, portions of fully drawn material with metallic luster with the oriented portions remaining clear.

It has been pointed out that the prior art processes have limited commercial utility due to the fact that they are operable only at low speeds. Surprisingly, the present process may be operated at high speeds. After the shaped article has been subjected to the treatment which introduces alternating segments of differential strain-response to drawing tension, a multiplicity of increments can be drawn simultaneously and consecutively to give a drawing speed which is a multiple of that described in the related prior art. Furthermore, the resulting product is a new, attractive, highly drawn material of uniform denier which has sections having a metallic luster alternating with sections of conventional clear appearance.

The invention will be more readily understood by referring to the following detailed description and the accompanying drawings. In the description, the term "yarn" is used to include filaments, ribbons and the like, of irregular as well as round, rectangular and other regular cross-section, and relates to both monofilament and multifilament yarns. The term "clear" will be used in the broad sense to include translucent as well as transparent materials.

FIGURE 1 is a schematic drawing of a suitable form of apparatus for carrying out the process of the invention;

FIGURE 2 is a schematic drawing of another embodiment of suitable apparatus;

FIGURE 3 is a perspective view of a round filament being drawn by the process of this invention, and FIGURE 3A is an elevational view of an undrawn portion of the filament shown in FIGURE 3. FIGURES 3B, 3C and 3D are sectional views of portions of the filament shown in FIGURE 3 showing the internal structure of the filament at different stages of drawing.

Referring to FIGURE 1 of the drawings, reference numeral 1 designates a yarn comprised of synthetic organic polymer which is passed from source 2 successively about feed rollers 3 and 4. The feed rollers are of relatively large diameter, about six inches, and the axes of the rollers are positioned at a slight angle to each other to cause a separation of the yarn helices and an advancement of the yarn along the rollers. The yarn is arranged with a sufficient number of turns about the set of feed rollers to prevent slippage of the yarn thereon. A suitable pre-tension device 11 may be used to regulate the unwinding of the yarn from source 2. The yarn or ribbon can desirably be removed from the supply package 2 in a twist-free manner.

The yarn is passed from the feed rollers 3 and 4 through a pigtail guide 5 and then through a yarn-driven rotary deforming device comprised of a notching roller 6 and a smooth back-up roller 7. The notching roller consists of a smooth brass cylinder having a plurality of notches 8 disposed along the edges of its periphery, with spaced projections 9 consisting of smooth wire passing over and above its peripheral surface 10 and being secured across the surface in opposite notches. The size of the projections, notching roller and back-up roller and the spacing of the projections can, of course, be varied, depending on the thickness of the yarn and the degree of deformation desired.

The yarn 1 must be an undrawn synthetic organic polymeric material which can be cold-drawn and must be essentially unoriented, e.g., having a birefringence not greater than 0.01. Preferably, the yarn is comprised of a high molecular weight synthetic organic polymer which is capable of being formed into filaments and when cold-drawn shows by characteristic X-ray pattern molecular orientation along the fiber axis. As the yarn passes between the notching roller 6 and the back-up roller 7, it is mechanically deformed. The projections 9 on the notching roller press into the undrawn yarn introducing draw initiation segments 22, as shown in FIGURES 3 and 3A, where each indentation occurs. The deformation of the yarn by the notching roller 6 generally increases the orientation and reduces the cross-sectional area.

The yarn is then passed over pin 12 which is about one inch in diameter and which is heated to a temperature of 50° C. to 140° C. Pin 12 is adjustable to position 13 so that the degree of wrap of the yarn around the pin may be varied to increase or decrease the amount of heating and the amount of tension applied to the filament. Although pin 12 may be heated above 80° C., the filament itself must be at a temperature of not more than 80° C.

From the heated pin 12 the yarn is passed to a set of drawing rollers 14 and 15 of comparatively large diameter, about six inches. The axes of the two rollers are positioned at a slight angle to each other in the same manner as described for the feed rollers 3 and 4. The yarn is arranged with a sufficient number of turns about the drawing rollers to prevent slippage.

As shown in FIGURE 3, the yarn approaching the heated pin 12 consists of increments of undrawn yarn $a$ and $a'$, separated by notches 22. Notches 22 each provide two incipient necks 26 and 26'. As each notch reaches the tangent line of departure from pin 12, it is subjected to a full drawing tension and, because of its reduced cross-sectional area, the stress is higher than in any undrawn segment. Therefore, incipient necks 26 and 26' start drawing the ends of the undrawn increments adjacent to the notch as shown between the increments $b$ and $c$ in the figure. Because the notching operation raises the birefringence in the notch above 0.01, this segment remains clear after drawing as shown at segments 22'.

As soon as the necks reach the undeformed polymer, the drawing of void-filled, lustrous yarn is started as shown in the figure at segments 23 and 24. It is also apparent in FIGURE 3 that each increment $b$ to $f$ is in a different stage of progression from undrawn to drawn fiber depending on its relative distance from pin 12. When necks 26 and 26' reach a junction 25, their common increment $g$ is fully drawn and will be replaced in the draw zone by the newly initiated drawing segment before increment $f$ becomes fully drawn. The preheating of a short zone ahead of each neck by the very high temperature generated internally assures the continuation of each neck, once initiated. At the junction of two necks, the overlapping of two such preheated zones raises the temperature of a very short segment to a value where clear drawing occurs, resulting in a short, highly oriented, clear zone 25, shown in FIGURES 3 and 3D. This type of clear section and that associated with the drawn out notches 22 are of a monolithic or solid structure, while the lustrous areas are filled with minute, elongated voids.

From drawing rollers 14 and 15 the fully drawn yarn may be passed through a heat-stabilization zone 31 to a reciprocating traverse guide 16, and finally wound on a bobbin 17 which may be rotated by drive roller 18.

A number of alternative methods and apparatus for introducing draw initiation segments, for example, points of higher orientation, may be used. In FIGURE 2 a segmented roller 19 and an additional set of drawing rollers 20 and 21 are substituted for the rotary stressing device shown in FIGURE 1. Segmented roller 19 is comprised of a heat-conducting core 27, alternately spaced heat-conducting segments 28, and substantially non-conducting segments 29. The conducting material may be steel, brass, stainless steel, nickel, etc., and the non-conducting material, mica, polytetrafluoroethylene resin, phenol-formaldehyde resin, nylon resin, etc. (Fluted rolls may be used in the same manner.) The segments are heated to a temperature from about 85° C. to 125° C. As each segment contacts the surface of the yarn, the yarn is heated to a temperature from about 82° C. to 120° C., at which temperature it will draw by conventional drawing processes, giving clear oriented sections from the segments which were heated. The drawing rollers 20 and 21 are rotated at a speed such as to produce a tension in the yarn sufficient to highly draw the heated sections at the natural draw ratio, usually about 3X to 5X. The unheated sections are not drawn. The yarn, at this stage intermittently drawn and undrawn, then passes in a helical path over rollers 20 and 21 and via an arc of contact with heated pin 12 to rollers 14 and 15 which are driven at a higher surface speed than rollers 20 and 21. The ratio of roller speeds is set to conform to the natural draw ratio of the undrawn segments under conditions for producing lustrous, void-filled material as already described. As the yarn passes over heated draw pin 12 the sharp shoulders separating drawn and undrawn segments provide areas of draw initiation because of stress concentration, and the unoriented sections draw at a draw ratio from about 5X to 7X to a metallic luster as previously described.

In addition to the methods already set forth for producing localized draw initiation zones having differing responses to drawing, other methods will be obvious. Since an absence of orientation, e.g., birefringence less than 0.01, is necessary for the yarn to draw to a metallic luster, any mechanical treatment which raises the orientation of the yarn, e.g., above a birefringence of 0.01, is suitable for practicing the invention. The draw initiation zones can be introduced in a longitudinal or transverse direction, or in a zig-zag or spiral fashion along the fiber axis. In addition to direct mechanical contact with the yarn, bending, flexing, or vibration may be used to produce localized orientation or deformation.

The preferred method of producing the localized deformed segments is with the apparatus shown in FIGURE 1. Obviously, a gear can be substituted for the notching roller 6. This method is very satisfactory and permits ready control of the spacing of the stress points by merely changing gear sizes.

Stuffing box crimpers of the type which force the yarn to fold back on itself are also suitable for this purpose. Because of the less rigid control over the folding process as compared with the opposed roller and gear device, the localized deformed segments are spaced at varying distances from one another.

Acoustically operated devices, such as fluttering reeds over which the yarn is passed while the reed vibrates, as well as other vibrating means in the sonic and ultrasonic frequency range, may be used. Eccentric wheels and other camming devices may also be used to produce localized deformed segments in the undrawn yarn.

In addition to the heated segmented roller 19, shown in FIGURE 2, other means for heating the yarn and subsequently stretching it to produce localized orientation, for example, a heated cam, heated gear, or fluted roller, may be used to soften the undrawn yarn to produce alternating regions which will respond to the tension produced in the yarn by drawing rollers 20 and 21.

Referring again to FIGURES 3 and 3B, it will be noted that the shoulders of the neck 26 from which the yarn draws are very sharp. It has been observed that a critical angle, measured between the tangent to the inflection point of the drawing neck and the fiber axis, of about 44°, exists below which only clear drawn material is produced. At greater angles, indicating a very high shear rate, lustrous void-containing material is produced. This critical angle is readily maintained by the process of this invention.

FIGURES 3, 3C and 3D show the transition of the clear undrawn section of yarn 1 which lies between lustrous sections 23 and 24 to a clear, fully drawn section 25 at the junction of the drawing necks. A slight reduction in cross-sectional area of section 25 is shown in FIGURE 3D in exaggerated form.

In FIGURES 3B, 3C and 3D it will be noted that the lustrous sections 23 and 24 are covered with a thin, clear skin 30. The combination of clear skin and void-containing structures produces the metallic luster in sections 23 and 24.

The invention will be further illustrated but is not intended to be limited by the following examples.

*Example I*

Polyethylene terephthalate was melt-spun through a spinneret to give a ribbon which was 0.022 inch wide by 0.0034 inch thick in the undrawn state having a birefringence of 0.0003. The undrawn material was then run through a notching device of the type shown in FIGURE 1 having 24 wires spaced to give indentations in the material 0.15 inch apart. The stressing roller and back-up roller were spaced apart so that the indentations made by the wires penetrated to approximately ⅓ the depth of the ribbon. The cross-sectional area of the ribbon at the notches was reduced approximately 30%. The ribbon was then passed over a pin heated to 88° C. and then to a set of drawing rollers positioned 24 inches away from the pin. The yarn did not reach thermal equilibrium with the hot pin because of the short contact time, but the pin heated the yarn sufficiently to initiate drawing. The undrawn material was fed through the notching device at a speed of 39 yards per minute, and the drawn material was wound at a speed of 223 yards per minute giving a draw ratio of 5.72X. As each segment of undrawn yarn passed over the hot pin, the tension produced by the draw rollers caused the material to draw. When the process reached a steady state, more than 10 increments were being drawn simultaneously. The total drawing process occurred over a distance measured along the yarn of approximately 5 inches. The resulting material was a highly drawn ribbon having portions which contained a large number of tiny, elongated voids which imparted a metallic luster to the drawn material alternating with short sections of ribbon of conventional clear appearance. The clear portions occurred at the sections of yarn which had been deformed by the wires on the notching roller prior to drawing and at the junction of the two drawing necks. The lustrous portions had a total length of 0.858 inch, and the clear portions were approximately 0.02 inch long. The polymer structure in the clear sections was monolithic.

*Example II*

In this example a metal blade was mounted so that the blade oscillated back and forth against the fiber. An undrawn polyethylene terephthalate ribbon 0.02 inch wide and 0.004 inch thick having a birefringence of 0.0005 was passed over the blade while the blade was vibrated in such a fashion that each cycle the blade stuck but did not cut the ribbon. The vibrating blade produced indentations, thereby providing oriented segments in the undrawn material at points about 0.0625 inch apart. The undrawn ribbon was then passed over a heated plate which was heated to a temperature of about 60° C., and then to a set of drawing rollers where it was drawn to give sections of metallic luster about 0.23 inch long separated by sections of conventional clear appearance about 0.11 inch long. As in the earlier example, as each oriented segment ran over the hot plate, drawing commenced simultaneously at both ends of the indentation. Clear sections appeared at the junction of the drawing necks. When steady state conditions were reached, the ribbon was drawing at four necks simultaneously.

*Example III*

Polyethylene terephthalate was melt-spun through a spinneret to give a ribbon similar to that described in Example I. The undrawn ribbon had a birefringence of 0.0003. The ribbon was then notched as in Example I. The undrawn material was fed through the notching device at a speed of 43 yards per minute, and the drawn material was wound at a speed of 264 yards per minute, giving a draw ratio of 6.14X. The undrawn material was passed over the hot pin which was heated to 88° C. with a 40° arc of contact. The tension produced by the draw rollers caused the material to start to draw at both sides of the notch as it came off the hot pin. The drawing conditions described gave a material which contained a large number of tiny, elongated voids which imparted a metallic luster to the drawn material. These lustrous sections alternated with sections of conventional appearance which coincided with the sections of yarn which had been deformed by the notching roller prior to drawing. Additional, very short, clear sections occurred at the junction of two drawing necks. Under the conditions described, the yarn drew at 37 necks simultaneously. The speed at which the metallic luster material was formed was 7.2 yards per minute at each neck.

*Example IV*

Polyethylene terephthalate was melt-spun through a spinneret to give 160 denier undrawn ribbon having a birefringence of 0.0003. The undrawn ribbon was colored by dyeing the polymer prior to spinning using a high-temperature stable dye mixture to give a clear, transparent yellow color. The ribbon was then run through the notching device described in FIGURE 1 at a speed of 43 yards per minute, over a pin heated to 81° C., with 140° angle of wrap around the pin, and then to a set of drawing rollers and wound up at a speed of 246 yards per minute, giving a draw ratio of 5.72X. As the undrawn material passed over the hot pin, the tension exerted by the drawing rollers caused the material to draw at each stress point as it came off the hot pin. The drawing process gave a material which had a metallic, lustrous, gold-like appearance. The metallic gold-appearing sections alternated with sections of translucent yellow color which coincided with the sections of yarn which had been deformed by the notching roller prior to drawing. Additional translucent yellow sections occurred at the junction of two drawing necks. The final product was a ribbon ½₀₀ inch wide and had a denier of only 28.

*Example V*

The experiment of Example IV was repeated, except that the hot pin was positioned so that the undrawn ribbon was tangent to the pin and the pin was heated to 139° C. The draw ratio in this case was 5.70X. The gold-luster ribbon was identical to that produced in Example IV. The ribbon produced was then woven into a flat fabric. The appearance of the fabric was both pleasing and striking.

*Example VI*

A 655 denier polyhexamethylene adipamide ribbon having a birefringence of 0.0005 was notched and drawn using the apparatus shown in FIGURE 1. The undrawn ribbon was given 2.67 notches per inch. The area surrounding the ribbon was at 29% relative humidity. The ribbon was fed through the notching device at 34 yards per minute and passed over the hot pin which was held at 110° C. The drawing rollers were operated at a surface speed of 160 yards per minute. Under these conditions, the ribbon drew at a draw ratio of 4.71X giving a highly lustrous metallic-appearing ribbon in which the metallic luster sections alternated with short, clear, conventionally drawn sections. The notched segments and the neck junctions remained clear after drawing. Under these conditions, 31 necks were observed to be drawing simultaneously.

*Example VII*

A 2365 denier ribbon of polyethylene terephthalate having an initial birefringence of 0.0003 was drawn, using apparatus similar to that shown in FIGURE 1. A toothed gear was substituted for the notching roller shown in the figure. The gear was three-quarters of an inch in diameter and had V-shaped teeth. The ribbon was passed through the device at a speed of 8.2 yards per minute to give 13.3 notches per inch. Following this operation, the ribbon was passed over a plate 8 inches long which was heated to 75° C. and then to a set of drawing rollers operating at a surface speed of 41 yards per minute. Under these conditions the ribbon drew at a draw ratio of 5.06X giving highly lustrous sections 0.18 inch long alternating with clear sections 0.02 inch and 0.005 inch long. The 0.02 inch clear sections resulted from drawing the notched segments and the 0.005 inch sections remained clear at the junction of the two drawing necks.

*Example VIII*

A 610 denier ribbn of 6 nylon, the polyamide produced by self-condensation of caprolactam, having an initial birefrigence of 0.0004, was notched and drawn using the apparatus shown in FIGURE 1. The wires on the notching roller were spaced 0.375 inch apart. The ribbon was fed to the notching roller at a speed of 41 yards per minute. The pin was heated to 142° C., and the drawing rollers were operated at 200 yards per minute. The ambient temperature was 24° C. and the relative humidity 30%. Under these conditions the ribbon was drawn at a draw ratio of 4.76X. Highly lustrous metallic-appearing sections having a large number of tiny, elongated voids, alternating with clear sections, were produced.

*Example IX*

A 467 denier ribbon of an undrawn polyacetal resin having an initial birefringence of 0, was notched and drawn using the apparatus shown in FIGURE 1. The wires on the notching rollers were spaced to produce prestressed areas in the ribbon which were 0.375 inch apart. The yarn was fed to the notching roller at a speed of 12 yards per minute and passed over the hot pin which was held at a temperature of 141° C. The drawing rollers were operated at a speed of 82 yards per minute, thus drawing the ribbon at a draw ratio of 6.83X. The ribbon had a silvery appearance with lustrous sections alternating with clear sections.

*Example X*

A polyethylene terephthalate ribbon having undrawn dimensions of 1.2 mm. wide and 0.115 mm. thick and an initial birefringence of 0.0006 was stressed and drawn in apparatus similar to that shown in FIGURE 2. A fluted roller was substituted for the segmented roller shown in FIGURE 2. As the undrawn ribbon was passed in contact with the flutes of the roller, which were heated to a temperature of about 95° C., a section 0.125 inch long was heated. The ribbon, without cooling, was then passed to a pair of drawing rollers which were operated at a speed of 20.7 yards per minute. The heated sections of ribbon were drawn at the natural draw artio, 4.6X, and drew giving a conventional clear-appearing product. No luster was observed. The sections which were not heated did not draw.

Following the clear drawing step, the ribbon was then passed to a second pair of drawing rollers which were operated at a surface speed of 47.3 yards per minute, drawing the undrawn material to 5.75 times its original length. It was observed that the undrawn sections of the ribbon started drawing as they left the first pair of drawing rollers and drew with a series of necks beginning with points adjacent the clear drawn sections. Sections drawn in the second step had a lustrous appearance. The resulting yarn was a very unusual and attractive material having alternating sections of metallic luster 0.63 inch long and conventional, clear-appearing sections 0.31 inch long. All of the sections of yarn were completely drawn, and there were no abrupt changes in diameter in transition points from one section to the next.

*Example XI*

A multifilament bundle of 30 undrawn polyethylene terephthalate fibers, having a total undrawn denier of 2090 and an initial birefringence of 0.0005 was notched and drawn in the apparatus shown in FIGURE 1. The wires on the notching roller were spaced to give a distance of 0.375 inch between notches. A finish applicator roller was placed between the feed rollers and the notching device, and a finish was applied to the yarn to consolidate the filaments, reduce static, and to increase the uniformity of heat transfer from the hot pin to the yarn. The finish applied was a silicone oil. The feed rollers were operated at a surface speed of 18 yards per minute and the drawing rollers were operated at a speed of 106 yards per minute, giving a draw ratio of 5.9X. A one-inch diameter stainless-steel pin was used and was heated to 54° C. The yarn was wrapped 80° around the pin. It was observed that as the yarn entered the notching device the bundle of filaments flattened out so that each filament was notched individually. In addition, cross-over points, that is, where one filament overlapped another, produced additional prestressed areas. The yarn drew to a denier of 354 with each filament having short, clear drawn sections and metallic luster sections similar to those described in the preceding examples. The final product was a silvery yarn having a very attractive appearance in which the short clear sections were not conspicuous due to their random location along the length of the yarn.

*Example XII*

A ribbon comprised of a polymer blend of 90% polyethylene terephthalate and 10% polymethylmethacrylate having an undrawn denier of 430 and an initial birefringence of 0.003 was notched using the apparatus described in Example VIII so that the prestressed areas were 0.375 inch apart. The ribbon was wrapped at an angle of 90° over a pin held at a temperature of 122° C. The notching roller was operated at a speed of 11 yards per minute. The drawing rollers were operated at a speed of 62 yards per minute giving a draw ratio of 5.6X. The ribbon had a silvery appearance with lustrous sections alternating with clear sections.

*Example XIII*

An undrawn polypropylene ribbon having an initial birefringence of 0.003 and a denier of about 600 was notched and drawn using the apparatus described in FIGURE 1. The pin was heated to 80° C., and the ribbon was drawn at a draw ratio of approximately 5.2X. The alternating clear and lustrous-appearing ribbon was wound up on the drawing roller at a speed of about 150 yards per minute.

While the above examples illustrate desirable and preferred methods, other methods for drawing and stressing the yarn may be used. Also, films, particularly in narrow width, may be substituted for the ribbons and filaments described. The following list gives an indication of the alternate procedures which can be employed in introducing incipient draw regions in portions of the yarn:

(a) snubbing the undrawn yarn with a variable tension snubbing device near the draw zone to cause rapid fluctuations of tension,
(b) feeding the undrawn ribbon between a timing belt sprocket and a timing belt,
(c) variable snubbing of the undrawn fiber between a heating plate and a reciprocating pad,
(d) use of eccentric rotating pins to vary yarn tension and/or to feed undrawn sections to different sections of a heating surface,
(e) use of an air jet to crease or fold undrawn fibers,
(f) use of wire grids or other spaced heating or cooling means,
(g) use of infrared radiation and a rotating shutter to interrupt the incident thermal radiation,
(h) creation during the spinning process of short range denier fluctuations by uneven quenching techniques,
(i) employing the notching roll during melt spinning of the yarn,
(j) applying warm fluid jets or droplets intermittently to the yarn as it enters the drawing zone,
(k) applying plasticizers intermittently or randomly to the yarn (both chemical plasticizers and physical plasticization, e.g., thermal treatment, are operative), and
(l) crystallizing the yarn intermittently by physical or chemical treatment prior to drawing.

The preferred procedure includes the use of a mechanical device to introduce incipient draw initiation zones in the undrawn yarn. When this method is used, it has been found that the drawing process is most readily controlled and excellent results are obtained.

Although the means for practicing the present invention may be selected from a wide variety of sources, the requirements for practicing the process are, as previously indicated, critical in many respects. The yarn must be essentially unoriented, e.g., the birefringence of the undrawn yarn is preferably below 0.01. Any of the known techniques for low tension spinning may be used to produce the low birefringence filament. A further requirement resides in the fact that the drawing conditions must be regulated as previously described so that the sections draw at their natural draw ratio.

By the phrase "natural draw ratio" is meant a draw ratio at which a certain degree of permanent, non-reversible extension, which is just sufficient to change it from its undrawn state to a uniformly drawn and highly oriented state without straining the polymeric material so as to introduce surface cracks or failure, is given to the polymeric material. In general, when any material is drawn in the conventional sense used in processing synthetic fibers one or both of two things happen. There can be plastic flow and there can be orientation of the material. The plastic flow method of drawing is used to elongate a polymeric material 10, 20, or even 100 times its original length. However, in the plastic flow process only slight orientation of the material occurs. Plastic flow drawing is normally carried out either at high temperatures or in the presence of plasticizers, or both. There is no natural draw ratio for plastic flow elongation. When a synthetic polymer is not in a plastic flowable condition it will, under normal conditions, tend to draw at its natural draw ratio and in the process become highly oriented. If, for example, an undrawn filament can be drawn to five times its original length to produce a highly oriented, uniformly drawn material, it is not possible, in general, to draw it completely at either four or six times its original length under the same conditions. If one attempts to draw to six times, the filament will break. If one chooses a lower value, for example, four times, one will find that some sections of the yarn will draw at the natural draw ratio while other sections will not draw at all.

As has already been indicated, the present invention is applicable to drawing filaments comprised of synthetic organic polymers. While the examples give an indication of some of the polymers which can be used, it is not intended that this invention be so limited. Among the synthetic organic polymers which may be used are film- and fiber-forming polyesters, polyamides, polyacetal resins, polyhydrocarbons prepared from ethylenically unsaturated monomers, polyurethanes, copolyamides and copolyesters, mixtures of polyethylene terephthalate and polymethyl methacrylate, and polyethylene terephthalate and polyethylene. Although any material which can be drawn by a process to give a void-containing lustrous appearance and can also be drawn by a proces which gives a clear, monolithic structure may be used, the high molecular weight synthetic linear organic condensation polymers are preferred because of their high strength, resistance to chemical attack, and the ease with which they can be drawn by either of the just mentioned processes.

The processes for preparing synthetic linear polymers are well known. The preparation of polyesters is described in the aforementioned United States patent to Whinfield et al. No. 2,465,319. In addition, polyesters comprised of such intermediates as trimethylene glycol, tetramethylene glycol, 1,6-hexane diol, 1,4-cyclohexane diol, 2,2-(p-hydroxy cyclohexyl)propane, bis-(p-phenylol)methane, trans-1,4-bis-(hydroxymethyl) cyclohexane, resorcinol, and the like, may be menttioned. In addition to terephthalic acid, isophthalic acid, adipic acid, sebacic acid, bibenzoic acid, and the like, are included. Polyamides may be prepared by the processes set forth in U.S. Patents Nos. 2,071,251, 2,071,253, 2,130,523, and 2,130,948, the polyacetal resins in U.S. Patent No. 2,768,994, the polyurethanes in U.S. Patent No. 2,731,446, and the polypropylene in U.S. application Serial No. 677,203, filed August 9, 1957.

The process of this invention may be used to produce novel yarns which may or may not contain dyes or pigments. Small amounts of pigments such as titanium dioxide, barium sulfate, cadmium sulfide, lamp black, and the like may be included in the polymer. Alternatively, suitable dyes such as amino-2-bromo-4-hydroxyanthraquinone and 1-(p-ethylolamino)-4,5-dihydroxy-8-nitroanthraquinone may be applied to the melt-spun undrawn ribbon. Of course, it is also possible to color the products of this invention by including a dyestuff such as one of those described in U.S. 2,571,319 in the melt prior to spinning.

In practicing this invention the polymers may also contain small amounts of impurities and reaction by-products which generally appear in continuous polymerization processes without harmful effect.

It has been found that the process is most readily controllable when the filamentary material has been allowed to age at room temperature for a period from twenty-four to forty-eight hours. However, material aged from one to two hours at 60° C. to 120° C. performs quite satisfactorily.

The products of the present invention have many uses. They may be used alone or in combination with conventional yarns to produce novel and pleasing textile fabrics. Cords, ribbons, and the like having a striking appearance may also be prepared. Papers containing staple fibers of the present invention have a highly attractive appearance and great covering power.

The products of this invention also have many desirable practical as well as aesthetic advantages over known novelty yarns. In addition to the striking appearance which can be achieved in textile fabrics, the yarns have a high bending modulus, high strength, and low dye and stain receptivity. Furthermore, the clear portions of the yarn are monolithic in structure.

A particular advantage of the present invention resides in the fact that the drawing process described can be accomplished at high speeds. In addition, the process is readily controllable and can be operated in a variety of different ways to produce strong, resilient material of uniform denier having alternating portions of contrasting apperance. Other advantages of the products and process of this invention will be apparent to those skilled in textile designing and the manufacturing of synthetic fibers.

It will be apparent that many widely different embodiments of this invention may be made without departing from the spirit and scope thereof and, therefore, it is not intended to be limited except as indicated in the appended claims.

I claim:

1. The process for producing a novel shaped article from a cold-drawable synthetic organic polymer which comprises introducing into a synthetic organic polymeric article having a birefringence of less than about 0.01 localized draw initiation zones having a birefringence above 0.01 and thereafter fully drawing said article at its natural draw ratio at a temperature of not more than 80° C. whereby opaque metallic lustrous portions and clear monolithic portions are produced in said article.

2. The process of claim 1 wherein said draw initiation zones are introduced by mechanically working said shaped article.

3. The process of claim 1 wherein said shaped article is in the form of a filament.

4. The process of claim 1 wherein said shaped article is in the form of a film.

5. The process of claim 1 wherein said polymer is a polyester.

6. The process of claim 1 wherein said polymer is a polyamide.

7. The process of claim 1 wherein said draw initiation zones have their major dimension at right angles to the direction of drawing.

8. The process of claim 1 wherein said draw initiation zones are introduced by heating portions of said shaped article to a temperature above 80° C. but below the melting point of said polymer and drawing said heated portions an amount sufficient to raise their birefringence above 0.01.

References Cited in the file of this patent

UNITED STATES PATENTS

| | | |
|---|---|---|
| 2,044,135 | Taylor | June 16, 1936 |
| 2,071,251 | Carothers | Feb. 16, 1937 |
| 2,264,415 | Taylor et al. | Dec. 2, 1941 |
| 2,352,725 | Markwood | July 4, 1944 |
| 2,917,779 | Kurzke et al. | Dec. 22, 1959 |
| 2,917,805 | Rokosz | Dec. 22, 1959 |
| 2,948,583 | Adams et al. | Aug. 9, 1960 |